United States Patent
Thompson

[11] 4,058,829
[45] Nov. 15, 1977

[54] TV MONITOR

[75] Inventor: John R. Thompson, Los Angeles, Calif.

[73] Assignee: Control Data Corporation, Minneapolis, Minn.

[21] Appl. No.: 714,432

[22] Filed: Aug. 13, 1976

[51] Int. Cl.² ............................................. H04N 7/02
[52] U.S. Cl. ........................................ 358/84; 325/31
[58] Field of Search ............................. 358/84; 325/31

[56] References Cited
U.S. PATENT DOCUMENTS

| | | | |
|---|---|---|---|
| 3,733,430 | 5/1973 | Thompson | 358/84 |
| 3,800,223 | 3/1974 | Mead | 325/31 |
| 3,803,349 | 4/1974 | Watanabe | 325/31 |
| 3,878,322 | 4/1975 | Sullivan | 358/84 |

Primary Examiner—Howard W. Britton
Attorney, Agent, or Firm—Robert M. Angus

[57] ABSTRACT

A TV monitor includes an antenna coupler capable of selectively coupling the TV receiver being monitored to an antenna or an r.f. oscillator. The oscillator is selectively operated to impose an r.f. signal onto the antenna input of the receiver between successive horizontal blanking periods on an active video line. One probe, connected to the horizontal retrace circuit of the receiver monitors the receiver for an "on" or "off" condition, while another probe, connected to the kinescope circuits of the receiver detects the channel to which the receiver is tuned. By successively stepping the r.f. oscillator through successive frequencies within the bandwidth of individual channels, and by monitoring the kinescope probe for that frequency which compares to that generated, channel identification may be determined. A plurality of individual monitors may be utilized with individual receivers within a household and the data may be collected and stored in a household collector for eventual transmission to a central station.

13 Claims, 3 Drawing Figures

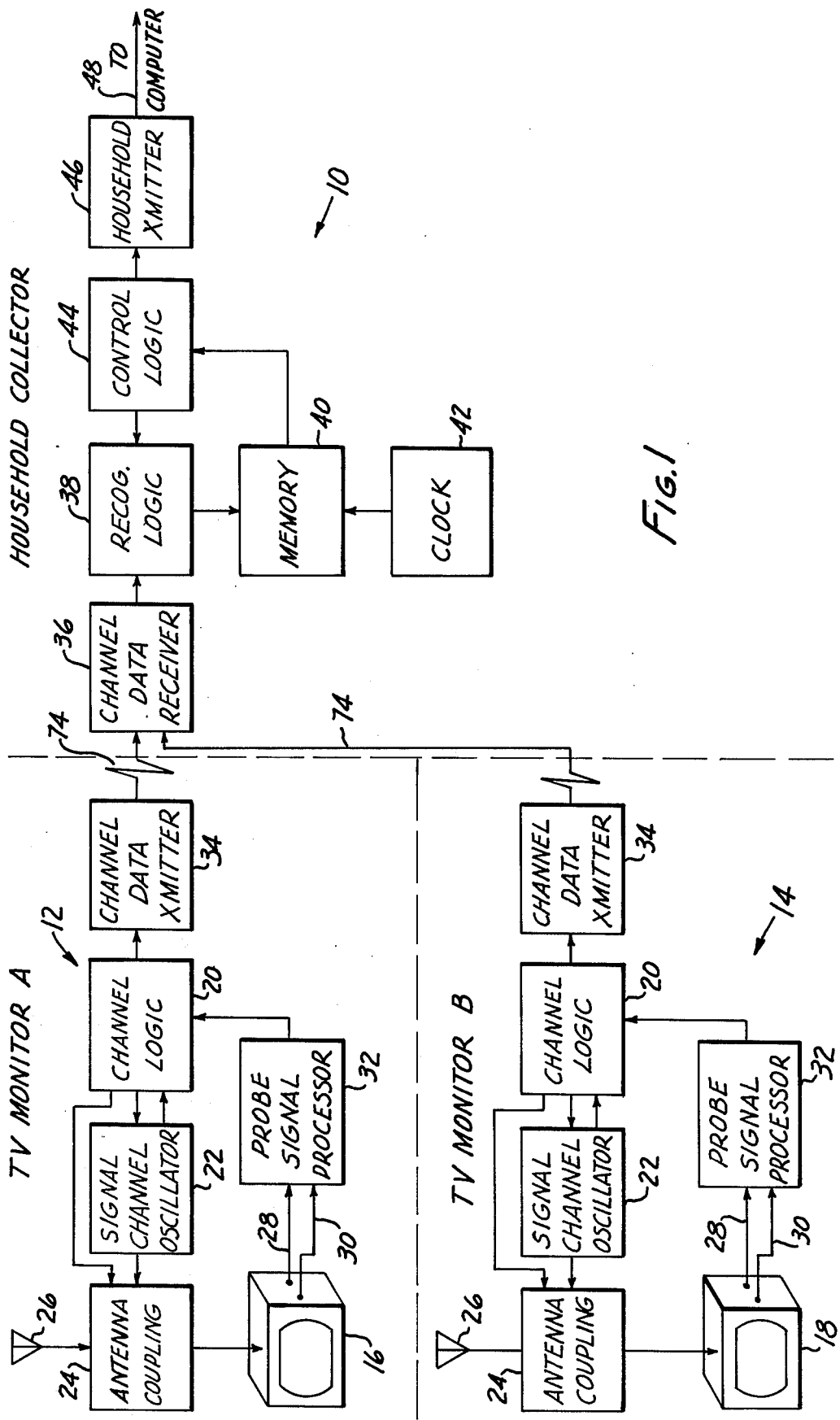

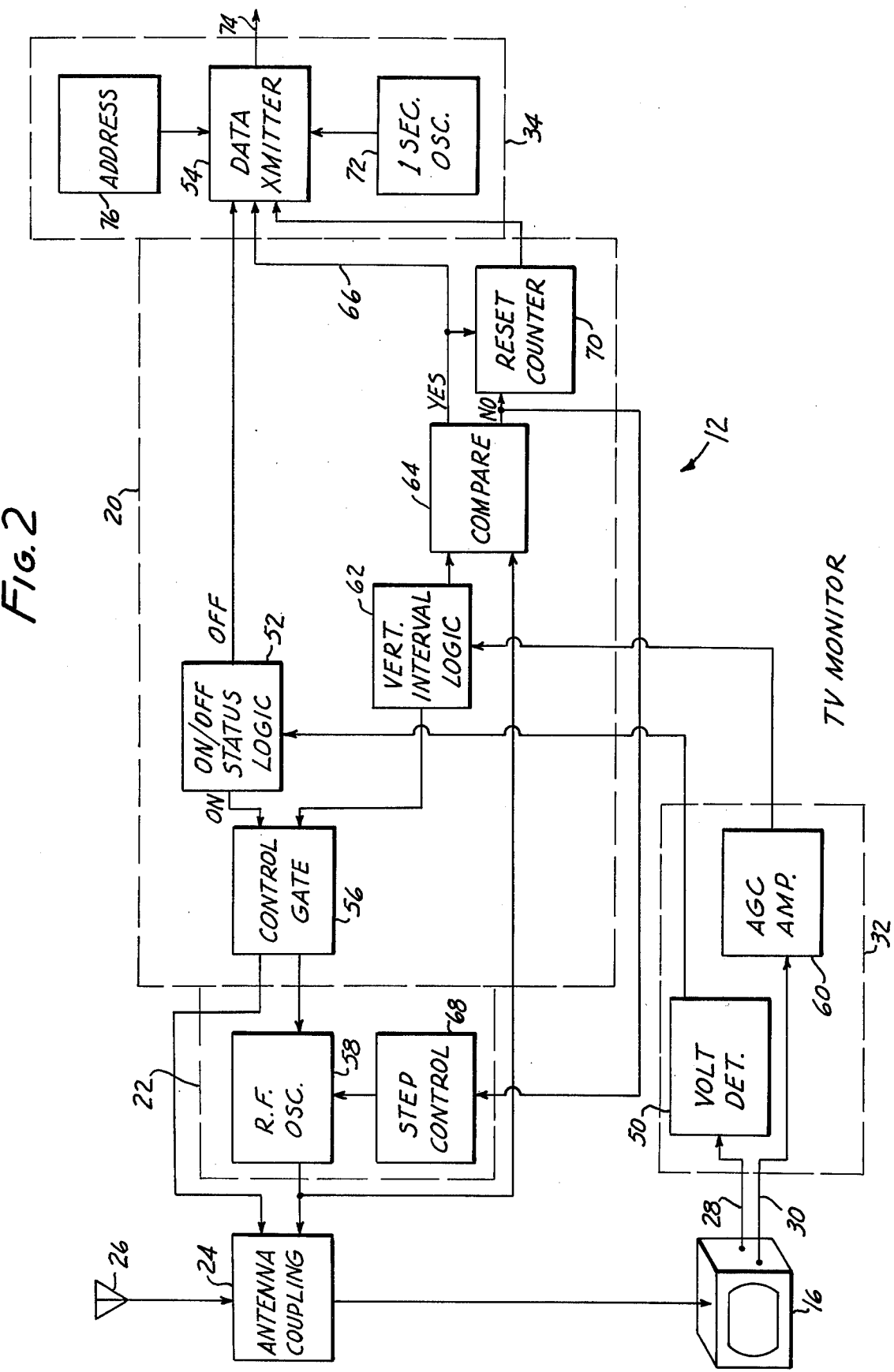

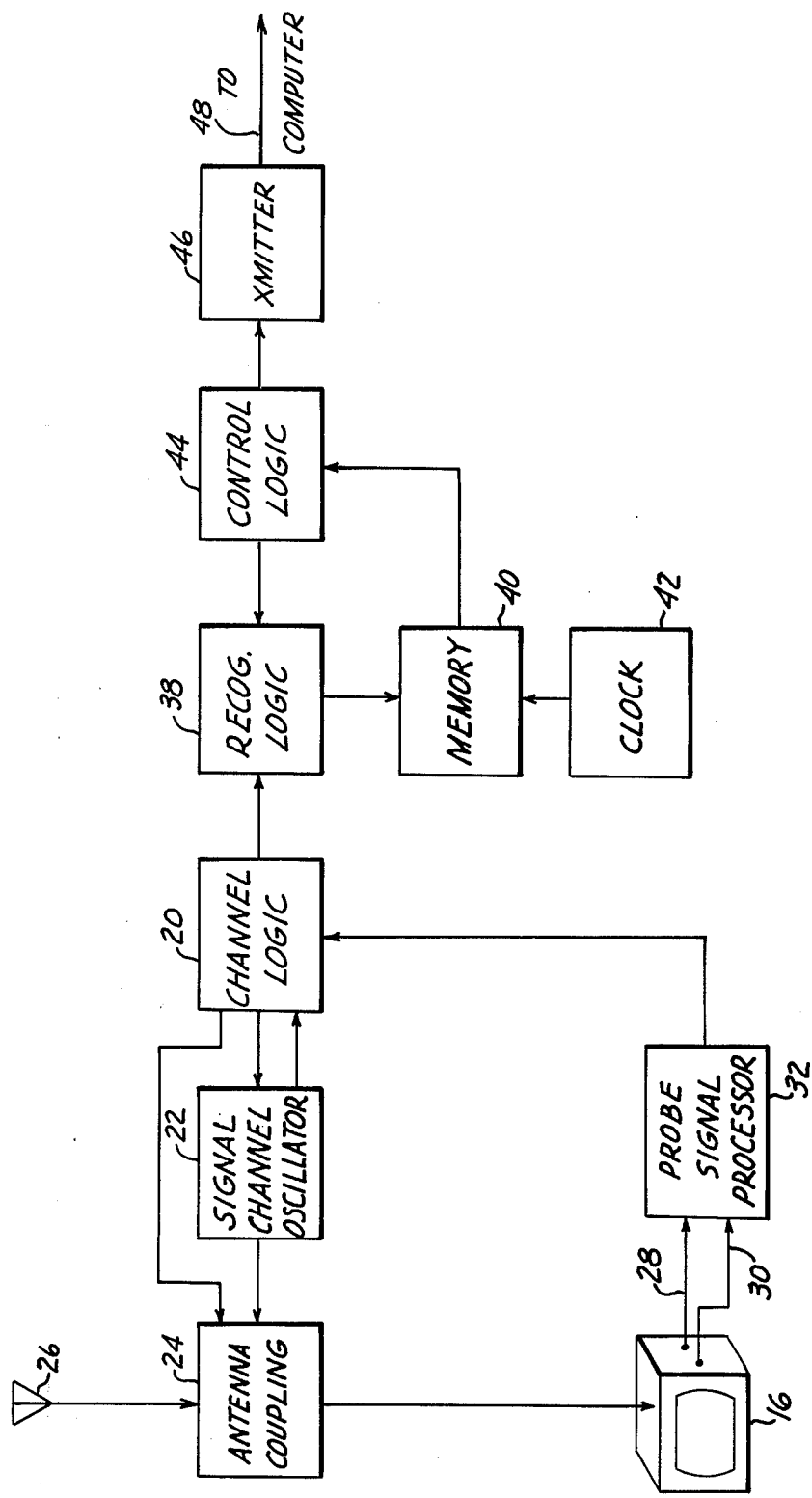

TV MONITOR

This invention relates to television monitoring, and particularly to apparatus for monitoring the status of a plurality of television receivers. The invention is particularly useful in "television audience measurement" surveys wherein the status and channel identification of a plurality of television receivers is monitored to obtain data concerning the popularity of television programs.

Heretofore television audience measurement surveys were often conducted by direct contact with television viewers, such as by telephoning them for information as to what programs were being viewed at a particular time, or by requesting selected persons to maintain diaries in which they recorded their viewing habits. Some attempts have been made to automatically monitor television receivers to determine the status of each receiver, but such apparatus have not been altogether successful due to electrical interference with the television receiver. Furthermore, information concerning television receiver status which is recorded locally at the television receiver must be collected in a manner which does not interfere with the ordinary operation of the household in which the set or sets are being monitored, and prior electronic techniques have not been altogether successful in transmission of data to a central location for collation with data from other households. Another problem with prior electronic monitoring apparatus has resided in the fact that such apparatus is ordinarily quite expensive, so the number of such monitoring apparatus must be limited, thereby limiting the scope of the survey.

The present invention is concerned with television monitoring apparatus capable of monitoring a plurality of television receivers to determine channel identification and receiver status for purposes of television audience measurement surveys. While the present invention will be described in connection with the use of the apparatus for television audience measurement surveys, it is evident to those skilled in the art that the apparatus is equally useful for pay television wherein the sets may be monitored for purposes of billing customers for programs subscribed on a fee basis.

It is an object of the present invention to provide a television monitor which is inexpensive and which accurately monitors television receivers for receiver status and transmits that information to a central station.

It is another object of the present invention to provide a television monitor which does not electrically interfere with the television receiver being monitored.

It is yet another object of the present invention to provide a television monitor which is capable of being easily attached to a television set and is capable of accurately monitoring the television receiver for receiver status.

In accordance with the present invention, a television monitor includes a signal oscillator capable of inserting a radio frequency signal onto the antenna leads of the television receiver being monitored, and detectors are provided to ascertain channel identification and receiver status and for transmitting that information to a central station, such as a central computer, for processing with information received from other television monitors.

According to one feature of the present invention, the status of the television receiver is monitored at successive intervals (for example, each second) and the status information is recorded in the memory of a collector unit. Periodically (for example, once each day) that information is transmitted to a central station via a suitable communications link, for example, telephone lines. At the central station, the information may be collated with information received from other television monitors to complete the audience measurement survey.

The above and other features of this invention will be more fully understood from the following detailed description and the accompanying drawings, in which:

FIG. 1 is a block circuit diagram of monitoring apparatus in accordance with the presently preferred embodiment of the present invention;

FIG. 2 is a detailed block circuit diagram of a television monitor for use in the apparatus illustrated in FIG. 1; and FIG. 3 is a block circuit diagram of monitoring apparatus for use with a single television receiver in accordance with a modification of the present invention.

With reference to the drawings, and particularly to FIG. 1, there is illustrated a television monitor system in accordance with the presently preferred embodiment of the present invention. The system includes a household collector illustrated generally at 10 coupled to a plurality of individual television monitors illustrated generally at 12 and 14. Each television monitor 12, 14 is connected to an individual televison receiver 16, 18, respectively. Television monitors 12 and 14 are identical in configuration, so only the television monitor 12 will be described in detail. Monitor 12 includes channel logic 20 connected to a signal channel oscillator 22. An antenna coupling 24 is coupled between antenna 26 and the television receiver 16. Channel logic 20 and oscillator 22 are also connected directly to antenna coupling 24. A pair of probes (not shown) are connected via suitable links 28 and 30 to probe signal processor 32 for input to channel logic 20. The output from channel logic 20 is provided to channel data transmitter 34. Each data transmitter 34 periodically transmits information via communication link 74 to household collector 10 where it is received by channel data receiver 36 for input to recognition logic 38. Logic 38 provides an output to memory 40 where information is stored. A real time clock 42 also provides information to memory 40 to identify the time of updating of memory 40. Memory 40 provides an output to control logic 44 which in turn provides an output to household transmitter 46 for transmission to a central station computer via channel 48.

With reference to FIG. 2, the details of television monitor 12 may be readily explained. Lead 28 is connected to a non-shielded electrostatic probe (not shown) which may consist simply of a wire connected directly to the horizontal retrace circuitry of the television receiver 16. A shielded electrostatic probe is connected to lead 30 and is wrapped around the luminance leads of the kinescope circuits of the television receiver. The probe connected to the horizontal retrace circuitry via lead 28 is connected to voltage detector 50 to detect the voltage level of the horizontal retrace circuitry of the receiver. The output of voltage detector 50 is connected to an input of status logic 52 to determine the "on/off" status of the television receiver. Thus, if the voltage appearing on the probe connected to the horizontal retrace circuitry is below a predetermined level established by voltage detector 50, the status of the set is determined to be "off", and that information is transferred to logic 52 for transmission to data transmitter 54. If, however, the receiver is determined to be in an "on"

condition, control gate 56 is conditioned to operate radio frequency oscillator 58. Particularly, logic 52 conditions gate 56 to operate oscillator 58 at a time immediately following a vertical interval of the kinescope and between two horizontal blanking periods on an active video line of the video reception circuitry. At that time, radio frequency oscillator 58 supplies a radio frequency signal within the frequency band of one channel capable of being received by receiver 16 to antenna coupling 24. At the same time, gate 56 operates coupling 24 to disconnect antenna 26 from receiver 16 and to connect oscillator 58 to receiver 16.

The radio frequency signal inserted by oscillator 58 onto the antenna leads of receiver 16 is inserted into the receiver circuitry. If the receiver is tuned to that channel corresponding to the frequency generated by oscillator 58, the luminance probe connected to lead 30 will detect a signal which will be amplified by automatic gain control amplifier 60 for insertion into the vertical interval logic 62. Logic 62 feeds back to control gate 56 to coordinate the operation of radio frequency oscillator 58 as heretofore explained.

Assuming the set was tuned to that channel corresponding to the radio frequency inserted by oscillator 58, logic 62 forwards a channel signal identification to compare circuit 64 which compares the received signal from logic 62 with that generated by oscillator 58. If a comparison is made (which it will be made in the event that the oscillator did insert a radio frequency signal corresponding to the channel to which the set was tuned), compare circuit 64 provides an output on lead 66 to data transmitter 54 indicative that the set was tuned to the particular channel.

If, however, the receiver was not tuned to the frequency established by a radio frequency oscillator 58, that fact is determined by a non-comparison by compare circuit 64, in which event an output is provided to step control 68 to control oscillator 58 to provide a different radio frequency signal during the next iteration between two horizontal blanking periods. At the same time, reset counter 70 is advanced one count for purposes to be hereinafter explained. Thus, assuming the set was not tuned to that channel corresponding to the signal provided by oscillator 58, during the next monitor cycle (between the next two horizontal blanking periods) a different signal frequency is inserted into the television receiver via the antenna leads for comparison by compare circuit 64. The process continues until a comparison is found between a signal detected by the luminance probe and that inserted by oscillator 58. At which point, compare circuit 64 provides information as to channel identification to data transmitter 54. Lead 66 is also connected to the reset portion of counter 70 to reset the count in counter 70 to zero.

Counter 70 is preferably a counter capable of advancing to an adequate count in excess of the number of channels capable of being received by the television receiver. For example, counter 70 may be capable of advancing to a count of 24, which is in excess of the number of television channels capable of being received in any particular community. In the event that counter 70 advances to its full count without being reset, such information is provided to data transmitter 54 to indicate a malfunction with the television monitor. It should be evident that in normal operation, reset counter 70 should never advance to its full count, but instead will be reset to zero each time a comparison is made as to channel identification.

Data transmitter 54 receives information from reset counter 70, compare circuit 64 and status logic 52. This information will indicate malfunction of the apparatus from reset counter 70, receiver status (that is whether the receiver is on or off) from logic 52, and channel identification from compare circuit 54. A free-running oscillator 72 provides periodic pulses to data transmitter 54. For example, oscillator 52 may provide pulses each second to data transmitter 54 thereby initiating transmission of data via communication link 74. Address circuitry 76 is also connected to data transmitter 54 to provide data concerning the identification of the particular television receiver being monitored.

With reference to FIG. 1, the data from each of the television monitors 12 and 14 transmitted via communication link 74 is received by channel data receiver 36 for processing by logic 38. Information concerning receiver status and identification of the receiver is forwarded to memory 40 and stored therein. At the same time, real time clock 42 provides the time of day for storage in memory 40. The data from memory 40 is forwarded back to control logic 44 for insertion into recognition logic 48, so that upon subsequent reception of the same information from each receiver, the memory is not updated with repetitive information. Instead, when a change in status occurs (e.g., change in channel reception or on/off status of the receiver), data concerning the new status is inserted into the memory 40. Thus, memory 40 contains data concerning the time period that each receiver was tuned to each channel.

Periodically, and preferably during a period of late night and early morning hours, the central station connected to communication channel 48 by a suitable telephone link automatically dials the telephone number of the household to gain access to the memory 40 through household transmitter 46, logic 44 and logic 38. At the time, the data within memory 40 is read out of necessary through logic 44 and is transmitted via communication channel 48 to the central station for collating with other data from other household receivers.

The transmission link 74 between channel data transmitters 34 and channel data receiver 36 may be any suitable communication link, such as radio frequency transmission at low power or power line transmission. It is preferred that all transmitters 34 within a particular household be tuned to the same carrier frequency to avoid interference between households so that data from one particular household is not collected by the household collector of another household. While a small risk exists that data from two or more television monitors within a particular household may be transmitted at precisely the same time, it is preferred that each oscillator 72 within transmitter 34 be adjusted to a slight variance from one second oscillation so that coincident transmission will occur only in a small percentage of cases. Further, data transmitters 54 of each television monitor are preferably adjusted to confine data transmission to less than 100 milliseconds so that the chance of overlap of data transmission from two or more television monitors is minimized. In those few cases where transmission from two or more television monitors occurs at precisely the same time, the information received by data receiver 36 in the household collector will not be recognized by recognition logic 38, so that data will be discarded, but new data will be received from each television receiver approximately one second later.

FIG. 3 illustrates a television receiver monitor for situations where a household may have only one television receiver to be monitored. The system illustrated in FIG. 3 is basically similar to that illustrated in FIG. 1, except that data transmitter 34 and data receiver 36 have been eliminated, as has communication channel 74. Thus, the apparatus illustrated in FIG. 3 is connected to a single set and provides channel data and set status directly to a central station.

One feature of the present invention resides in the fact that antenna coupling 24 switches the antenna input to receiver 16 between the television antenna 26 and the signal oscillator 22. This prevents spurious rebroadcast of signals from oscillator 22 by way of antenna 26, and permits accurate identification and insertion of signal frequencies within the frequency of each channel to be received directly onto the antenna leads of the television receiver. Further, in the event of malfunction of the apparatus, the home owner may disconnect the television monitor by merely reconnecting the antenna 26 directly to the antenna leads of receiver 16.

The apparatus according to the present invention is useful for television monitoring for the purposes of audience measurement surveys, fare collection, etc., and is simple and efficient in operation. The apparatus is relatively inexpensive, thereby permitting the production of a great number of monitor units to increase the number of monitored receivers for audience measurement purposes. In this regard, a plurality of individual television monitors 12, 14, may be provided in any particular household, apartment house, etc., each connected to a single household collector 10 which receives and collects the data from each television monitor. By providing a unique address for each television monitor, information may be collated concerning the programs received by each receiver. This information will be particularly valuable in connection with demographic studies wherein particular sets are ordinarily viewed by particular people, such as children, adults, etc. Thus, a television receiver located in the living room or family room of a home would be most likely viewed by the entire family, whereas television receivers located in children's rooms might more likely be viewed by the children.

This invention is not to be limited by the embodiments shown in the drawings and described in the description, which are given by way of example and not of limitation, but only in accordance with the scope of the appended claims.

What is claimed is:

1. In a system for monitoring the reception status of a television receiver capable of detecting selected ones of a plurality of wave signals, each representing a separate video channel, said receiver including an antenna for receiving said wave signals, a horizontal retrace circuit and a kinescope circuit, monitoring apparatus comprising: first probe means connected to said horizontal retrace circuit for detecting a voltage in said horizontal retrace circuit; second probe means connected to said kinescope circuit for detecting a signal frequency in said kinescope circuit; voltage level detector means connected to said first probe means for detecting a predetermined level of the voltage on said first probe means; first logic means connected to said voltage level detector means for providing a first gate signal when said voltage level detector means detects a voltage on said first probe means less than said predetermined level and providing a second gate signal when said level detector means detects a voltage on said first probe means equal to or greater than said predetermined level; second logic means connected to said second probe means for providing a first signal representative of the signal frequency detected by said second probe means and providing a third gate signal between successive horizontal blanking periods on an active video line of said kinescope circuit; oscillator means for selectively generating one of a plurality of radio frequency signals within the bandwidth of the wave signals representative of separate video channels, antenna coupling means for selectively coupling said television receiver to said antenna and to said oscillator means; gate means connected to said first and second logic means and to said oscillator means and said antenna coupling means and responsive to said second and third gate signals for operating said oscillator means to generate a radio frequency signal within the bandwidth of a channel and for operating said antenna coupling means to couple said television receiver to said oscillator means and decouple said antenna from said television receiver, thereby impressing said radio frequency signal onto the antenna input of said television receiver between horizontal blanking periods on an active video line; compare means connected to said oscillator means and said second logic means for comparing the frequency of the signal generated by said oscillator means with said first signal representative of the signal frequency detected by said second probe means; control means connected to said compare means and to said oscillator means and responsive to a non-coincidence of signals compared by said compare means for controlling said oscillator to generate another radio frequency signal upon the next operation of said gate means; and transmitter means connected to said first logic means and to said compare means and responsive to said first gate signal for transmitting status data indicative that said television receiver is in an "off" condition, and responsive to a coincidence of signals compared by said compare means for transmitting status data indicative that said television receiver is in an "on" condition and indicative of the channel to which said television receiver is tuned.

2. A system according to claim 1 further including resettable counter means connected to said compare means for advancing a count upon each instance that said compare means detects a non-coincidence between said signal generated by said oscillator means and said first signal and for resetting said count upon a coincidence of signals compared by said compare means, said transmitter means being connected to said counter means and responsive to a predetermined count to transmit data indicative that said monitoring apparatus has detected that said television receiver is neither in an "off" condition nor tuned to any predetermined channel.

3. A system according to claim 1 wherein said transmitter means includes third logic means connected to said first logic means and to said compare means for formulating status data representative of either the "off" condition of said television receiver or the "on" condition of said television receiver and the channel to which it is tuned, clock means for generating time data representative of time, and memory means connected to said third logic and said clock means for storing said status data and said time data.

4. A system according to claim 3 further including resettable counter means connected to said compare means for advancing a count upon each instance that said compare means detects a non-coincidence between said signal generated by said oscillator means and said first signal and for resetting said count upon a coincident of signals compared by said compare means, said transmitter means being connected to said counter means and responsive to a predetermined count to transmit data indicative that said monitoring apparatus has detected that said television receiver is neither in an "off" condition nor tuned to any predetermined channel.

5. A system according to claim 3 wherein said third logic means is responsive to status data stored in said memory means to inhibit said memory means from successively storing identical status data.

6. A system according to claim 3 wherein said transmitter means further includes a data transmitter connected to said third logic means for transmitting data stored in said memory means to a central station.

7. A system according to claim 6 further including resettable counter means connected to said compare means for advancing a count upon each instance that said compare means detects a non-coincidence between said signal generated by said oscillator means and said first signal and for resetting said count upon a coincidence of signals compared by said compare means, said transmitter means being connected to said counter means and responsive to a predetermined count to transmit data indicative that said monitoring apparatus has detected that said television receiver is neither in an "off" condition nor tuned to any predetermined channel.

8. A system according to claim 1 wherein there are a plurality of monitor apparatus each connected to an individual television receiver, and each of said transmitter means includes address means for supplying address data unique to the individual television receiver, each of said transmitter means periodically transmitting said status data and address data, said system further including: receiver means for receiving status data and address data from each of said monitor apparatus; clock means for generating time data representative of time; and memory means connected to said receiver means and to said clock means for storing said status data, said address data and said time data.

9. A system according to claim 8 further including resettable counter means connected to said compare means for advancing a count upon each instance that said compare means detects a non-coincidence between said signal generated by said oscillator means and said first signal and for resetting said count upon a coincidence of signals compared by said compare means, said transmitter means being connected to said counter means and responsive to a predetermined count to transmit data indicative that said monitoring apparatus has detected that said television receiver is neither in an "off" condition nor tuned to any predetermined channel.

10. A system according to claim 8 further including third logic means connected to said receiver means and to said memory means and responsive to status data and address data stored in said memory means to inhibit said memory means from successively storing identical status data from each monitor apparatus.

11. A system according to claim 10 further including second transmitter means connected to said third logic means for transmitting data stored in said memory means to a central station.

12. A system according to claim 10 further including resettable counter means connected to said compare means for advancing a count upon each instance that said compare means detects a non-coincidence between said signal generated by said oscillator means and said first signal and for resetting said count upon a coincidence of signals compared by said compare means, said transmitter means being connected to said compare means and responsive to a predetermined count to transmit data indicative that said monitoring apparatus has detected that said television receiver is neither in an "off" condition nor tuned to any predetermined channel.

13. A system according to claim 11 further including resettable counter means connected to said compare means for advancing a count upon each instance that said compare means detects a non-coincidence between said signal generated by said oscillator means and said first signal and for resetting said count upon a coincidence of signals compared by said compare means, said transmitter means being connected to said compare means and responsive to a predetermined count to transmit data indicative that said monitoring apparatus has detected that said television receiver is neither in an "off" condition nor tuned to any predetermined channel.

* * * * *